US008823392B2

(12) United States Patent
Meierer

(10) Patent No.: US 8,823,392 B2
(45) Date of Patent: Sep. 2, 2014

(54) WEB-ENABLED CONTROLLER FOR IMPEDANCE TUNER SYSTEMS

(75) Inventor: Roman Meierer, Lachine (CA)

(73) Assignee: Maury Microwave, Inc., Ontario, CA (US)

( * ) Notice: Subject to any disclaimer, the term of this patent is extended or adjusted under 35 U.S.C. 154(b) by 323 days.

(21) Appl. No.: 13/081,462

(22) Filed: Apr. 6, 2011

(65) Prior Publication Data

US 2012/0259911 A1 Oct. 11, 2012

(51) Int. Cl.
*G01R 27/28* (2006.01)
*H04L 12/24* (2006.01)
*H04L 12/26* (2006.01)
*H04L 29/08* (2006.01)
*H04B 1/18* (2006.01)
*H04B 1/04* (2006.01)
*H04L 29/12* (2006.01)
*H04W 4/00* (2009.01)

(52) U.S. Cl.
CPC .......... *H04B 1/0458* (2013.01); *H04L 41/0253* (2013.01); *H04L 43/50* (2013.01); *H04L 61/2015* (2013.01); *H04L 67/34* (2013.01); *H04W 4/001* (2013.01); *H04L 67/025* (2013.01); *H04B 1/18* (2013.01); *H04L 67/02* (2013.01)
USPC ........... 324/650; 324/637; 324/638; 324/642; 324/647; 370/338; 370/332; 709/203

(58) Field of Classification Search
USPC .......................................... 709/203; 324/650
See application file for complete search history.

(56) References Cited

U.S. PATENT DOCUMENTS 7,243,040 B1 * 7/2007 Mayock et al. ............... 702/122
7,548,069 B2 6/2009 Simpson (Continued)

OTHER PUBLICATIONS

Notification of Transmittal of the International Search Report and the Written Opinion of the International Searching Authority, or the Declaration, PCT/US2012/031412, dated Jul. 19, 2012, with ISR and Written Opinion.

(Continued)

*Primary Examiner* — Faruk Hamza
*Assistant Examiner* — Shah R Zaman
(74) *Attorney, Agent, or Firm* — Larry K. Roberts

(57) ABSTRACT

A system and method for controlling an impedance tuner system. In one embodiment, a web-enabled electronic controller controls an impedance tuner system including a signal transmission line and an electronically-controllable impedance-varying system coupled to the signal transmission line for affecting the impedance presented by the signal transmission line. The controller has a communication port, and an electronic processor configured to process external command signals and generate electronic control signals to configure the impedance-varying system in response to the command signals. An electronic memory stores sets of data and one or more web pages. The controller has a communication server and is configured to receive or send signals through a communication channel from or to a client computer system. The communication server is configured to be responsive to a request message from a client computer system to send a response comprising a web page to the client computer system. The controller processes commands received from the client computer system into the electronic control signals.

An exemplary embodiment of a method for controlling an impedance tuner system includes providing a web-enabled controller having a communication server, storing web pages on the controller, sending a client request to the communication server from a client computer through a communication channel, in response to the client request, sending the web page to the client computer from the impedance tuner system through the communication channel, entering user commands through the web page and transmitting signals representing the user commands to the tuner controller, and processing the user commands by the tuner controller to provide tuner drive signals to set the tuner to a state determined by the user commands.

39 Claims, 13 Drawing Sheets

(56) References Cited

U.S. PATENT DOCUMENTS

| | | |
|---|---|---|
| 7,589,601 B2 | 9/2009 | Simpson |
| 8,203,348 B1 | 6/2012 | Tsironis |
| 8,255,503 B2 * | 8/2012 | Harvey et al. .................. 709/223 |
| 2004/0119481 A1 * | 6/2004 | Tsironis ......................... 324/637 |
| 2005/0168326 A1 * | 8/2005 | White et al. ............. 340/310.01 |
| 2008/0076354 A1 * | 3/2008 | Rofougaran ................. 455/41.2 |
| 2009/0146757 A1 | 6/2009 | Vellas et al. |
| 2010/0045447 A1 * | 2/2010 | Mollenkopf et al. .... 340/310.11 |
| 2011/0033183 A1 * | 2/2011 | Doverspike et al. ............ 398/49 |
| 2012/0049970 A1 * | 3/2012 | Simpson ....................... 333/17.3 |

OTHER PUBLICATIONS

Data Sheet for Electronic Microwave Impedance Tuner, Maury Microwave Corporation, 2007.

Screen Shot from website, www.focus-microwaves.com, regarding user-programmable "iTuner," with a 2006 copyright date.

* cited by examiner

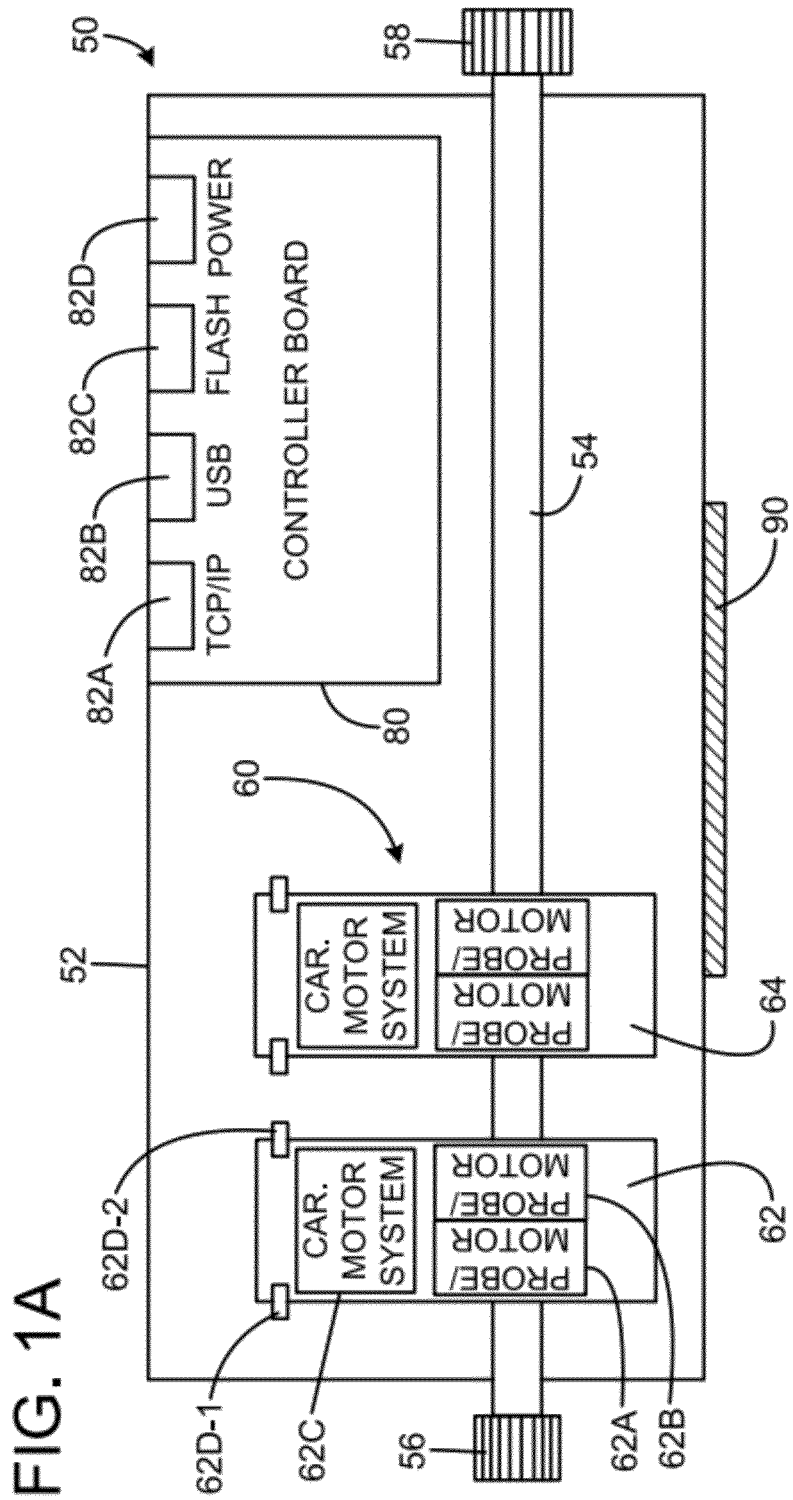

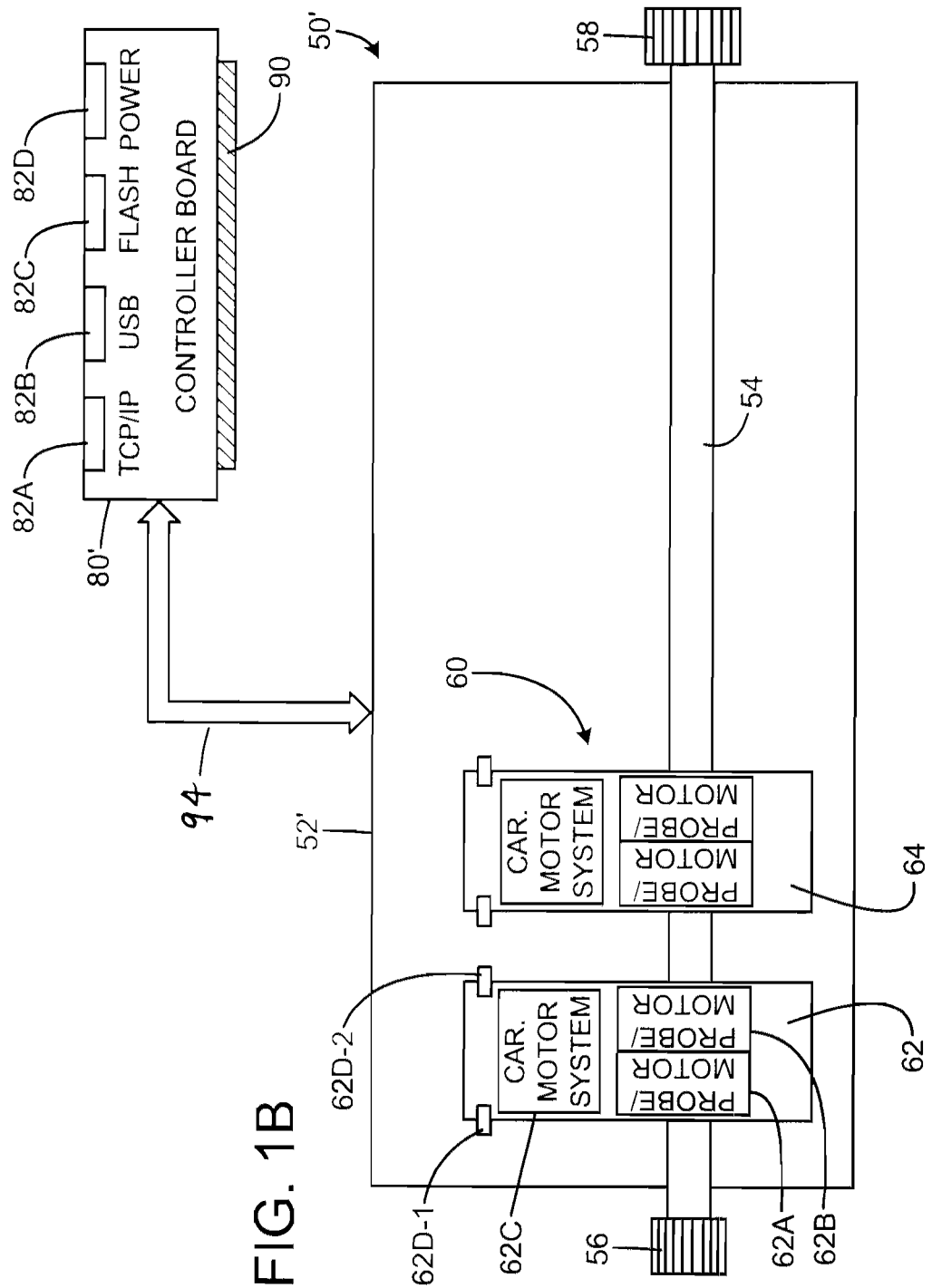

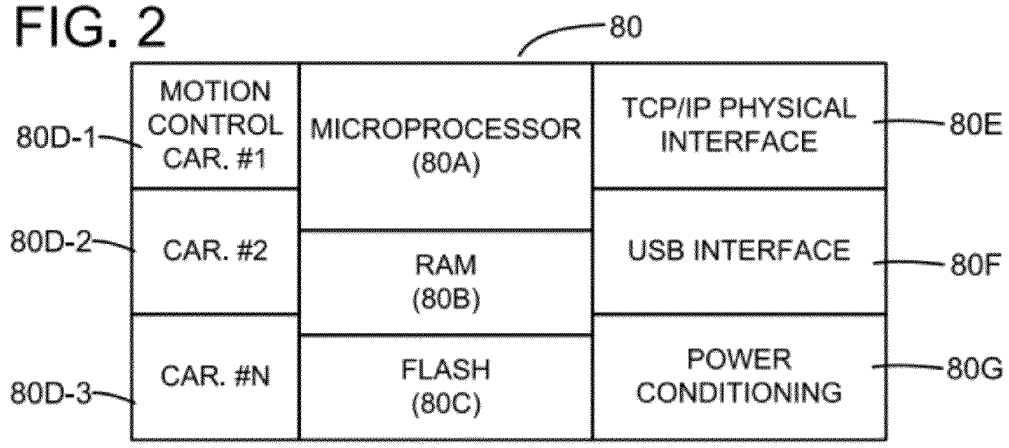
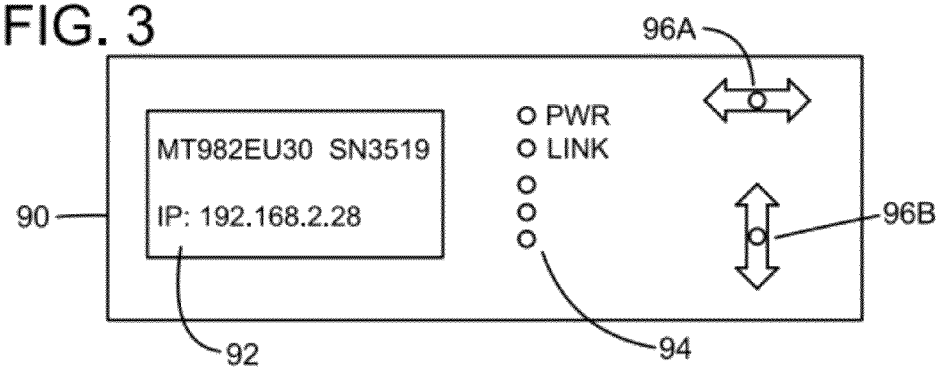
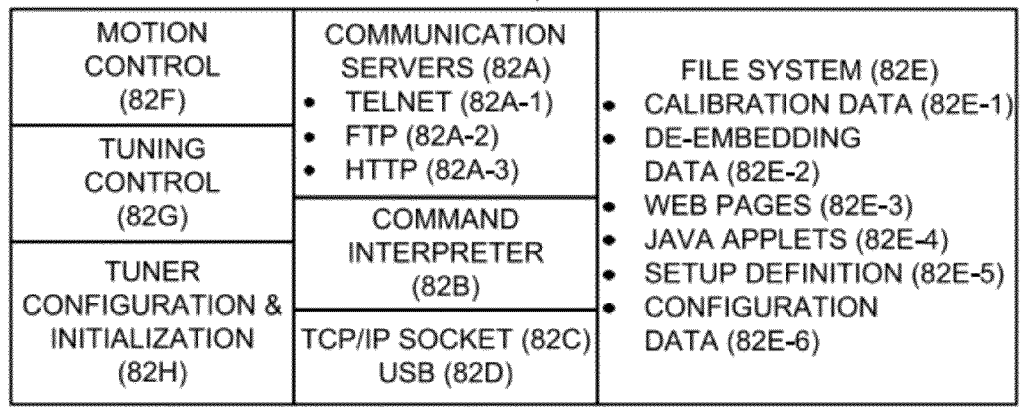

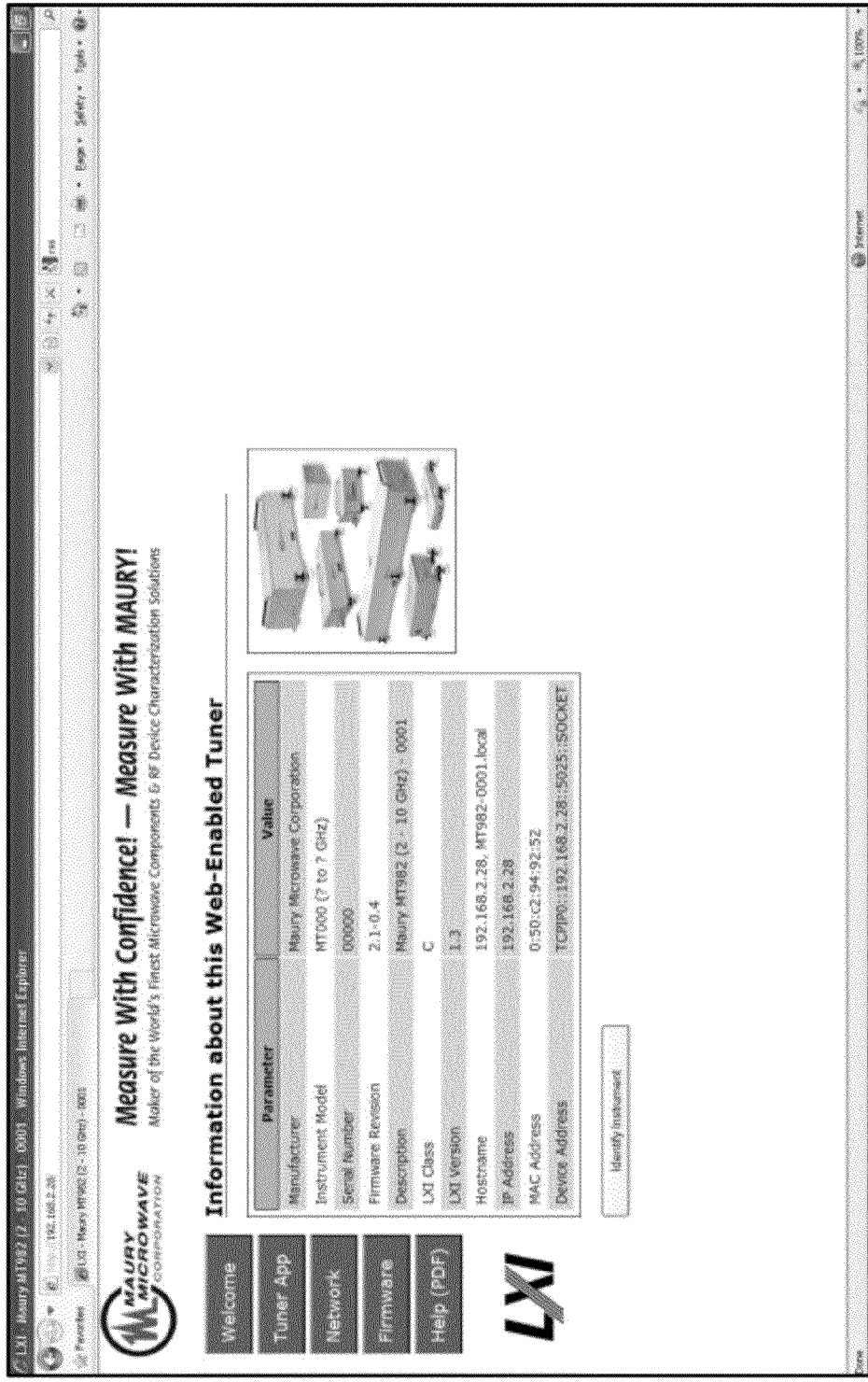
FIG. 6  Web Welcome Page

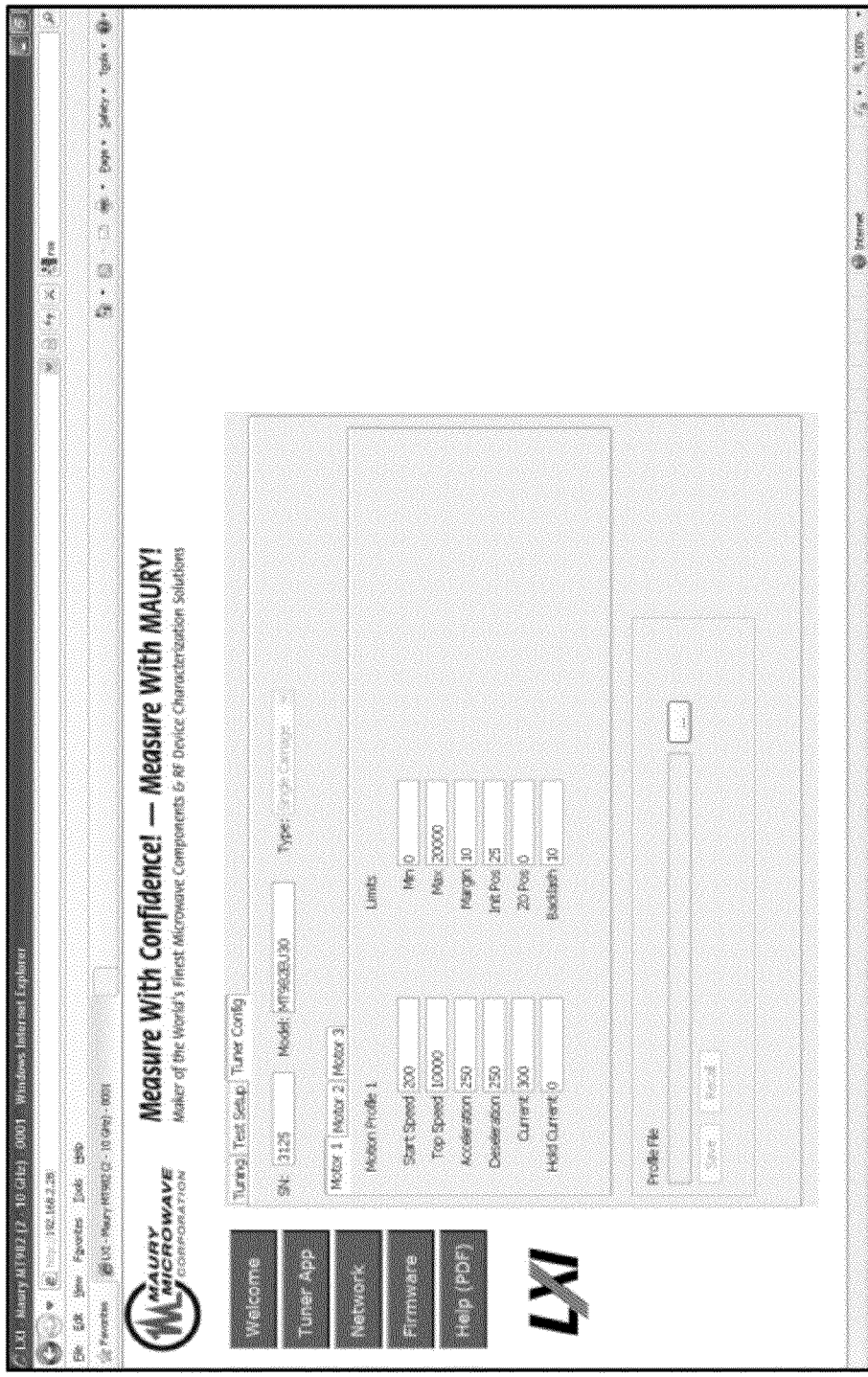
FIG. 7  Tuner Applet: Configuration Tab

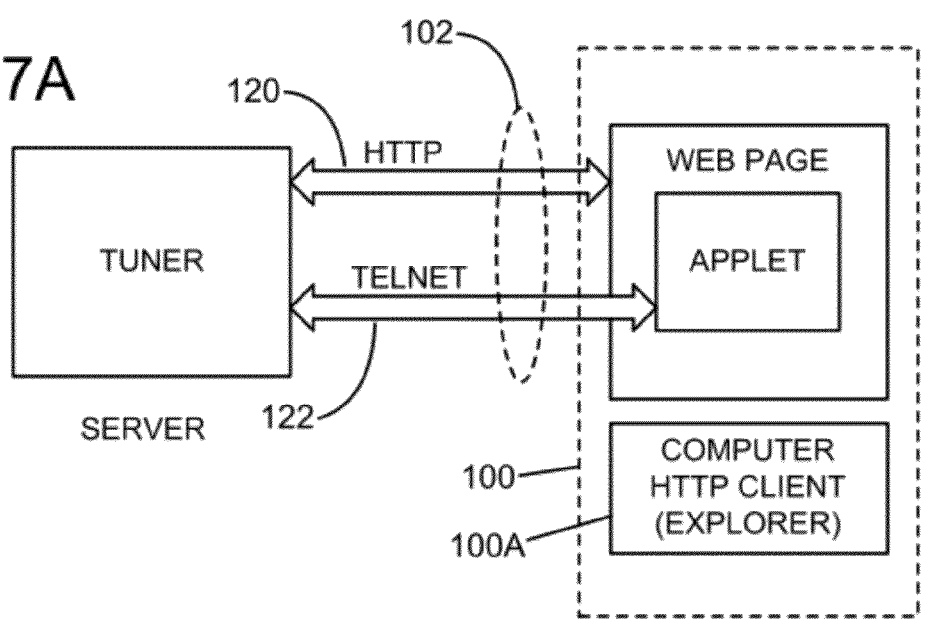

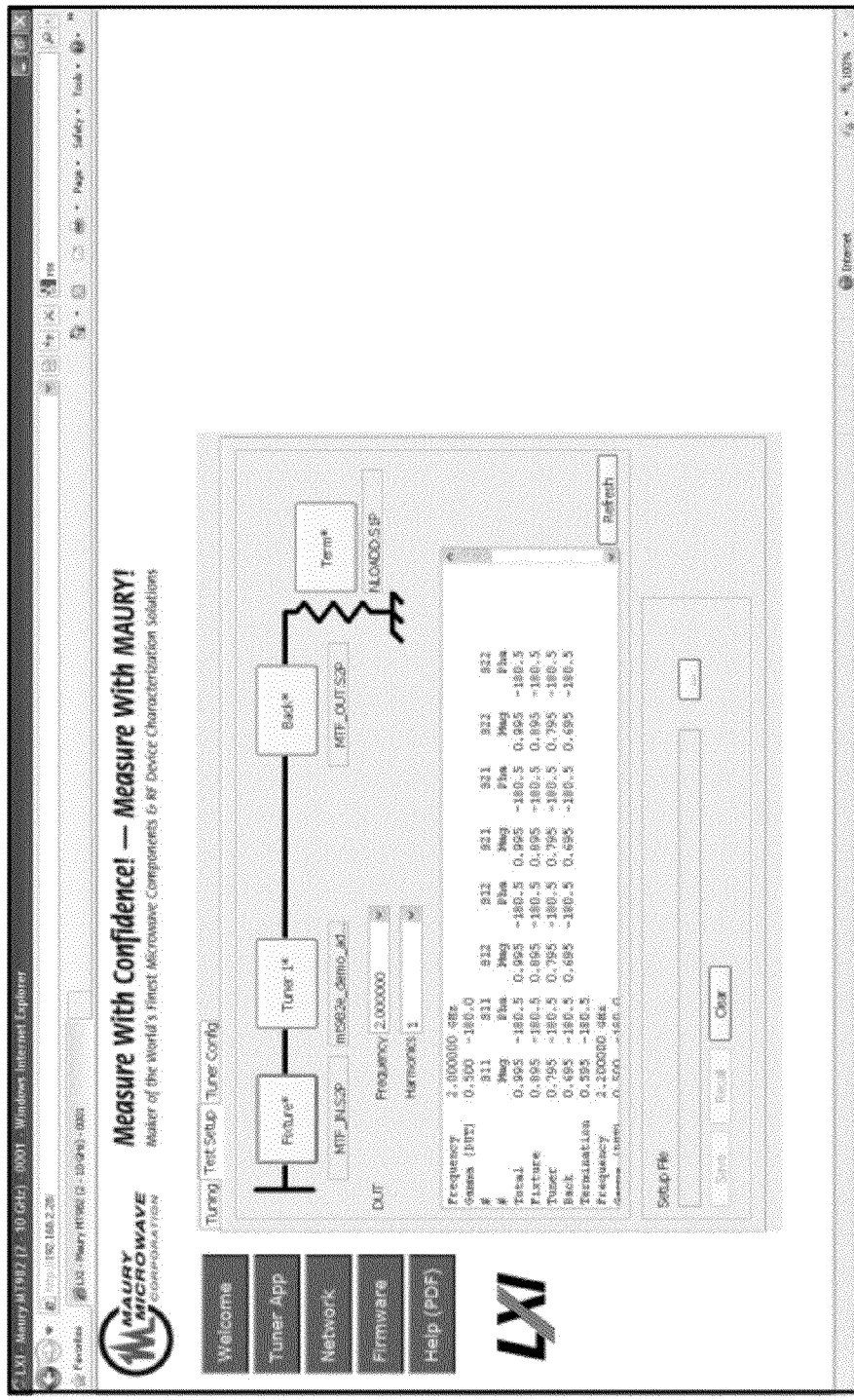
FIG. 8  Tuner Applet: Test Setup Tab

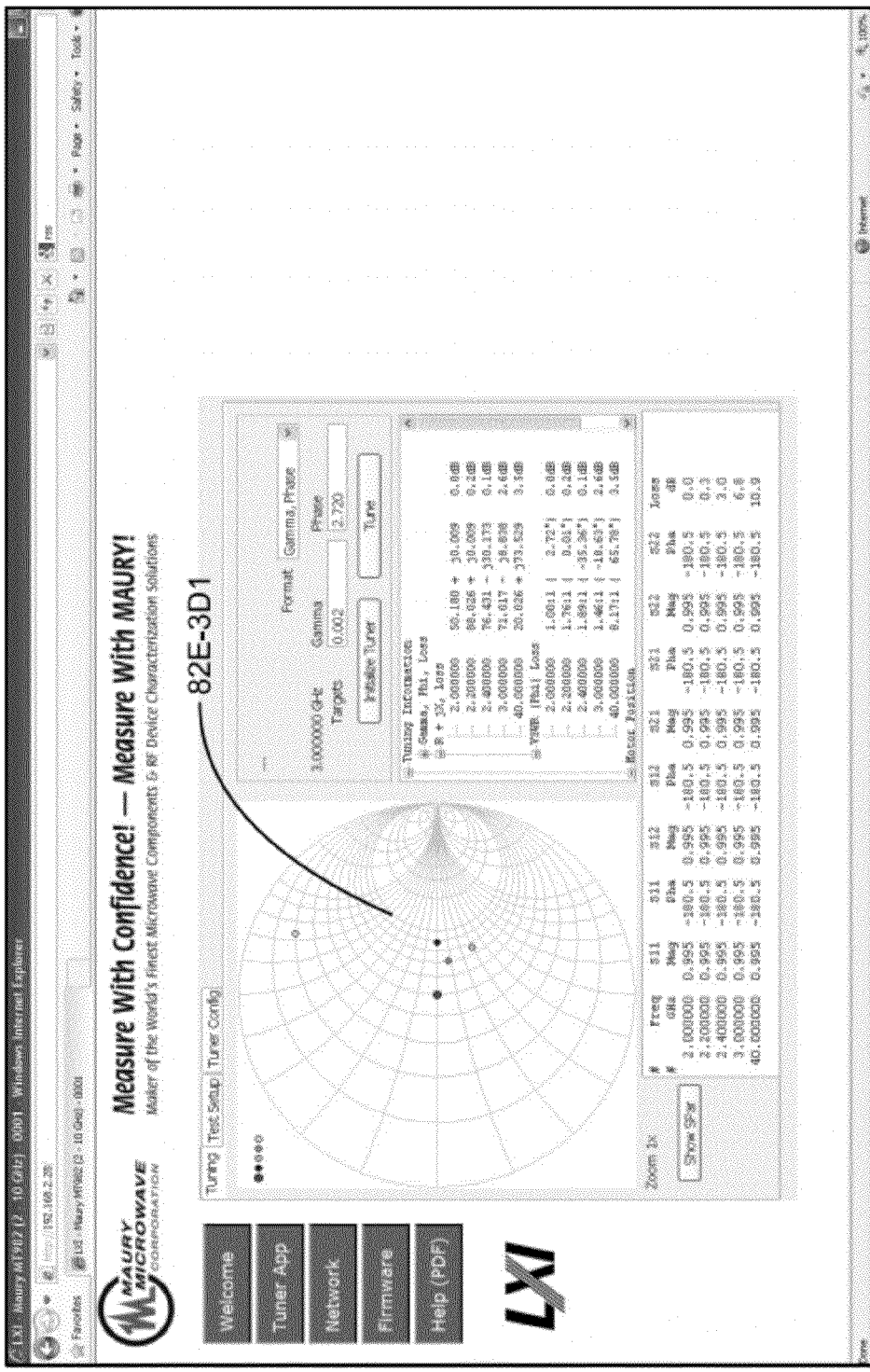
FIG. 9  Tuner Applet: Tuning Tab

FIG. 10  Web Network Configuration Page

WEB-ENABLED CONTROLLER FOR IMPEDANCE TUNER SYSTEMS

BACKGROUND

A Radio Frequency (RF) measurement system is one that measures something about a Device Under Test (DUT) by sampling and measuring signals applied to and coming from the DUT. A vector measurement system will measure both magnitude and phase information, while a scalar measurement system will measure magnitude only.

In this document, a "tuner system" or "impedance tuner system" will refer to a RF measurement system which uses some kind of tuner or tuners to control impedance seen by the DUT.

An "automated tuner" may be computer controlled; a "manual tuner" is controlled manually by the user. Automated tuners are commercially available, for example, model MT982EU30 by Maury Microwave Corporation.

There are various types of impedance tuners. A slide screw tuner includes a transmission line in some media, such as coaxial, slabline, waveguide, microstrip, etc. One or more probes can move perpendicular to the center conductor. As a probe moves closer to the center conductor, the mismatch at some frequency will increase, while the mismatch decreases as the probe moves away from the center conductor. At some point, when the probe is far enough away, it has very little effect on the fields around the center conductor, so the transmission line looks nearly like a uniform line without a deliberate mismatch. A solid state tuner has multiple solid state elements which are controlled to effect impedance variation, e.g. a number of PIN diodes, FETs or other solid state devices coupled to a transmission line. Impedance variation is achieved by applying DC control signals to bias individual solid state elements or a combination of solid state elements. In the case of PIN diodes, the diodes are biased in either the forward or reverse direction.

The electronically-controlled tuner systems are controlled by providing signals to cause the impedance-varying elements to assume a particular state or position.

BRIEF DESCRIPTION OF THE DRAWINGS

Features and advantages of the disclosure will readily be appreciated by persons skilled in the art from the following detailed description when read in conjunction with the drawing wherein:

FIG. 1A diagrammatically illustrates an exemplary embodiment of an electromechanical impedance tuner system.

FIG. 1B diagrammatically illustrates an exemplary embodiment of an electromechanical impedance tuner system with external controller system.

FIG. 2 is a simplified controller hardware block diagram for the exemplary tuner system of FIG. 1.

FIG. 3 illustrates an exemplary embodiment of a display panel mounted on the tuner front panel.

FIG. 4 is a simplified controller functional block diagram illustrating functions implemented by the exemplary controller of the system of FIG. 1.

FIG. 5A shows a direct connection using an RJ-45 Ethernet cable. FIG. 5B shows a connection of one or more than one tuner with the computer via a hub/switch with an integrated DHCP server. FIG. 5C shows a wireless connection using a wireless router.

FIG. 6 is an exemplary screen shot of a main web page displayed when the user's browser connects to the tuner, by navigating to the IP address of the tuner.

FIG. 7 illustrates a screen shot of an exemplary TUNER APP web page with an embedded JAVA applet. FIG. 7A diagrammatically illustrates how the JAVA applet opens a direct telnet communication channel to the tuner to send commands and retrieve data.

FIG. 8 shows a screen shot of an exemplary TUNER APP Test Setup page that allows the user to configure the tuner setup.

FIG. 9 shows a screen shot of an exemplary TUNER APP tuning page.

FIG. 10 depicts an exemplary network configuration web page of the tuner.

DETAILED DESCRIPTION

Figure 1:
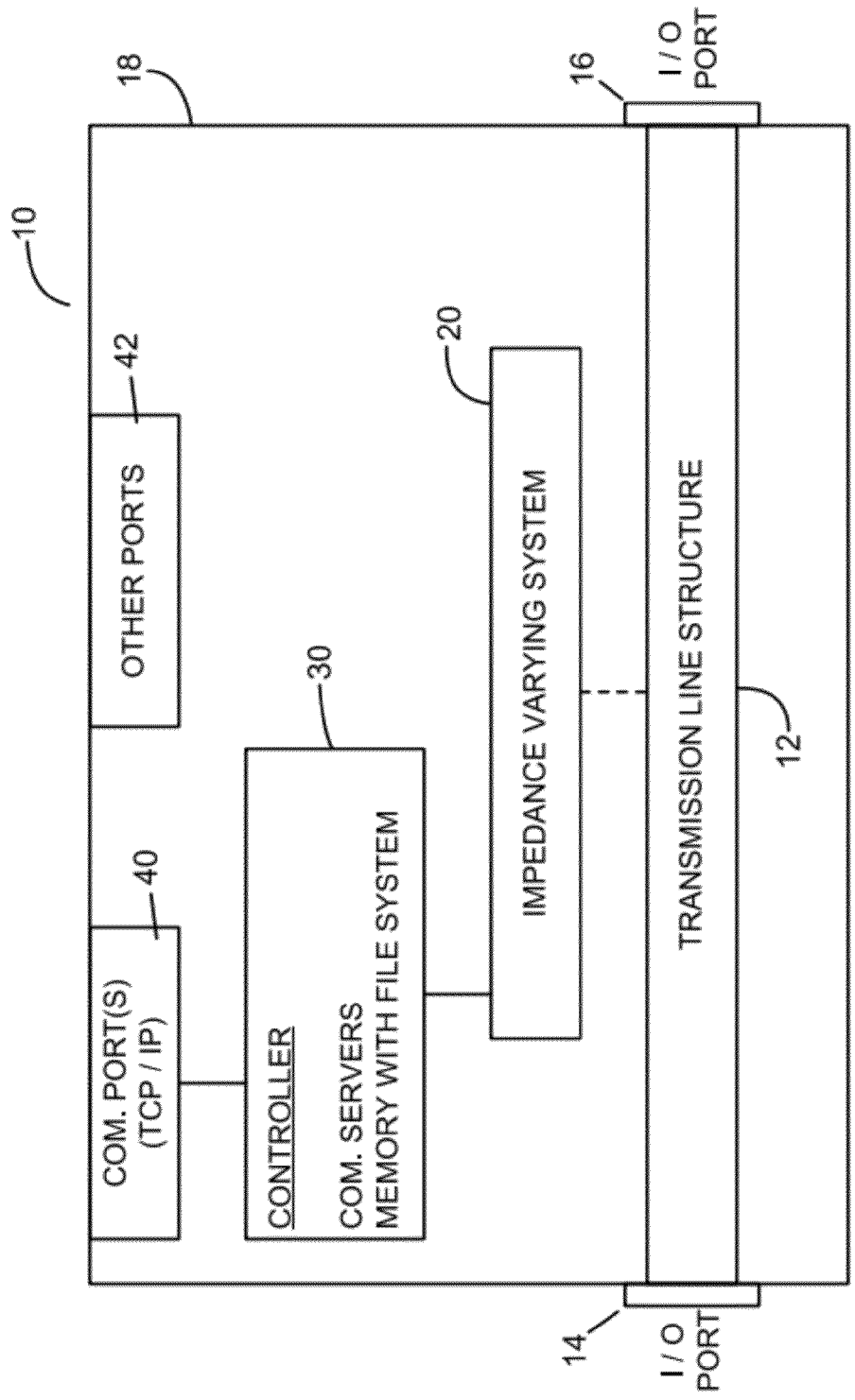
FIG. 1 is a simplified schematic diagram of a tuner system with an integrated controller system.

In the following detailed description and in the several figures of the drawing, like elements are identified with like reference numerals. The figures are not to scale, and relative feature sizes may be exaggerated for illustrative purposes.

In a general sense, an exemplary embodiment of a web-enabled tuner is an impedance tuner, which includes a signal transmission line and an impedance-varying system coupled to the transmission line. FIG. 1 is a simplified block diagram of an exemplary tuner system 10, including the RF signal transmission line 12 with I/O ports 14 and 16. An impedance varying system 20 is coupled to the signal transmission line to selectively affect the impedance presented by the signal transmission line, as is well known in the art. In one exemplary embodiment, the impedance tuner can be an electromechanical tuner with the typical features of a transmission line, one or more probes mounted on one or more probe carriages, and motors for moving the probes and carriages in the horizontal and vertical axes relative to a transmission line axis. The tuner 10 can have sensors such as position detection sensors to limit the horizontal and vertical movements of the probes, and obtain initialization information regarding the carriages. In other embodiments, the impedance tuner can be a solid state tuner, with impedance variation achieved by applying control signals to solid state elements. A controller 30 is provided to convert user commands such as desired gamma settings for a selected frequency into electronic control signals for controlling the impedance-varying system. The controller 30 can be mounted on board the impedance tuner, i.e. integrated with the tuner and inside the tuner housing, or it can be external to the tuner housing. In the case of an electromechanical tuner, the control signals can include motor drive commands for positioning the probe or probes at a desired position or positions to affect the impedance. The controller 30 in this embodiment is connected to communication port(s) 40, and includes communication server and memory functions. The tuner 10 typically has other ports 42, such as a power input port, a USB port and the like. The communication port may be a port capable of TCP/IP support, e.g. an RJ-45 Ethernet port.

An exemplary embodiment of a web-enabled tuner or tuner controller in accordance with this invention may include one or more of the following features. A web-enabled tuner or tuner controller is one which is configured to be controlled from a standard web browser, such as Microsoft Explorer, Mozilla Firefox, Google Chrome, and Apple Safari, via a TCP-based network.

1) A web-enabled built-in or integrated, tuner controller (30). This will avoid the need for the customer to connect a stand-alone controller to the tuner, through a jack or USB connector, to provide drive signals to the carriage motors and to process the sensor signals. The built-in controller may be microprocessor-based, or fabricated as an application specific integrated circuit (ASIC) or field programmable gate array (FPGA).

2) A web-enabled tuner controller external to the tuner, and configured for connection to the tuner by, e.g., a USB or other communication link.

3) A server function integrated on the tuner, or with the controller.

4) The controller is configured so that the tuner operator can use a computer or terminal, such as a PC, with a client application such as a web browser to navigate to the IP address of the tuner, which can be configured to download a web page or pages to the PC. The web pages provide a visual or graphical interface for the user to set up and control the operation of the tuner. The operational instructions to the tuner are processed by the tuner controller, for example, to determine the motor commands needed to obtain the desired tuner operation in the case of an electromechanical tuner, or determine solid state control conditions, e.g. in the case PIN diodes, the diode bias conditions, for a solid state electronic tuner.

5) The web page may include an embedded JAVA applet, providing the capability of graphical tuner control, and opening a Telnet communication channel to the tuner and allowing text-based command signals to be sent to the tuner from the PC. In an exemplary embodiment, the JAVA applet runs on the PC, and provides on the PC:

(i) a visual setup web page for the tuner,
   (ii) a tuning web page, and
   (iii) a settings web page.

6) The tuner web page may be configured to allow textual web tuning by typing a tuning target or other tuner data point or command in a text box (e.g. in an HTML page) without a JAVA applet, and the controller retrieves data entered by user from the HTML page and acts on this information to control the tuner.

7) An on-board file system with the controller acting as an FTP server. FTP client software, such as File Explorer, on a PC can be used to access on-board file system, allowing files to be transferred between the PC and tuner. The on-board file system in an exemplary embodiment is configured to store calibration and s-parameter data files, as well as configuration and setup data.

As noted above, the web-enabled tuner controller may be external to the tuner, and connected to the tuner by a communication link. A user at a PC or other terminal can still control the tuner through commands transmitted to the tuner controller, which in turn processes the commands and generates the appropriate tuner control or drive commands. This embodiment may be useful to control existing, fielded tuner systems, without requiring expensive retrofits.

FIG. 1A shows an exemplary embodiment of an electromechanical impedance tuner system 50. In this example, the impedance tuner includes a housing structure generally indicated as 52, and an RF signal transmission line 54, in this example a slab line, with input/output (I/O) ports 56, 58 for connection to a DUT, signal source, termination, network analyzer or other equipment in a measurement or calibration setup. The impedance varying system 60 in this embodiment includes one or multiple (two are shown in this example) carriages 62, 64, each mounting one or multiple probes (two in this example) and a motor system. Thus, carriage 62 includes probes/motors 62A and 62B, each mounted for and including a drive motor for imparting probe movement in directions transverse to the longitudinal axis of the signal transmission line 54, and a carriage motor system 62C for moving the carriage along the longitudinal axis of the transmission line. By moving the probes closer to or away from the transmission line, the impedance of the transmission line is varied. Limit switches 62D-1 and 62D-2 are mounted at opposite sides of the carriage 62 to provide position signals which may be used in initialization and collision alert/avoidance of the carriages. Carriage 64 is similarly equipped. Other tuner systems may employ other combinations of elements.

The tuner 50 includes an integrated controller 80, and a display 90. The controller for the tuner has several connectors or ports, in this case a TCP/IP port 82A, a USB port 82B, a connector 82C configured for an SD flash memory card, and a power port 82D for providing power to the tuner system.

FIG. 1B illustrates an alternate embodiment, in which the controller 80' is external to the housing 52' of the impedance tuner 50', and is electrically connected to the tuner 50' through a communication channel 94 such as a USB connection. The controller 80' is web-enabled, and is otherwise as described above regarding the controller 80 of FIG. 1B.

FIG. 2 is a simplified controller hardware block diagram for an exemplary embodiment of the controller 80. The controller includes a processor 80A, in this example a microprocessor, random access memory (RAM) 80B, a flash memory 80C, and motion control functions 80D-1, 80D-2 . . . 80D-N for generating drive signals for multiple carriages/probes. The controller also includes TCP/IP and USB physical interfaces 80E and 80F, and a power conditioning module 80G to provide appropriate power levels for the controller.

In an exemplary embodiment, the tuner, in the case of a tuner with an integrated controller, or the controller in the case of an external tuner controller, may be provided with a display for displaying information to the tuner operator. FIG. 3 illustrates a display panel 90 mounted on the tuner housing or controller housing in the case of an external controller. In this example, the display may including a 2×20 character display 92 to show the tuner model, serial number and the controller IP address, and several status LEDS 94 to indicate various status conditions such as POWER, LINK, and the like), and MOVEMENT LEDS 96A and 96B illustrating motion of the tuner carriages.

FIG. 4 is a simplified controller functional block diagram, of the functions implemented by the controller 80. Major functions include motion control 82F, tuning control 82G, tuner configuration and initialization 82H, communication servers 82A (Telnet 82A-1, FTP (file transfer protocol) 82A-2 and HTTP (Hypertext Transfer Protocol) 82A-3 in this exemplary embodiment), a command interpreter 82B, TCP/IP socket support 82C and USB support 82D, and the file system 82E. The file system may include files such as calibration data 82E-1, de-embedding data 82E-2, web pages 82E-3, JAVA applets 82E-4, setup definition data files 82E-5 and configuration data 82E-6.

The HTTP server 82A-3 delivers web pages on request to the client, and is also used to receive and process content posted back from the client.

The FTP server 82A-2 allows moving files between external client computers and the file system of the controller over a TCP-based network.

The Telnet server 82A-1 enables bi-directional interactive text-oriented communication over TCP network.

In an exemplary embodiment, the file system, e.g. a FAT (file allocation table), on the controller non-volatile memory is used to store:

(i) web pages and Java applets to be sent by the HTTP server to the client;

(ii) tuner configuration and calibration data;

(iii) s-parameter de-embedding data for fixtures and other setup components;

(iv) setup definition files; and (v) firmware files.

The file system can be remotely accessed via the FTP server over the TCP network established between the tuner controller and a client computer system. Files can be transferred over the network. Typically, for example, a tuner system may be calibrated using a calibration setup, and the calibration data files created on a separate test equipment. The calibration data files as well as other files can be transferred to the controller file system using the FTP server, for example.

HTTP, FTP and Telnet servers are per se well known.

In an exemplary embodiment, the three communication servers (FTP, HTTP and Telnet) are running concurrently in the controller 80, and all incoming request and postings are forwarded to the command interpreter 82B which in turn will check the command syntax and initiate appropriate action, such as dispatching tuning commands or returning status information to the client.

The tuning control function 82G uses tuner calibration and de-embedding data loaded from the file system 82E to translate tuning commands received from the command interpreter into control signals for the impedance varying system, e.g. motion control signals for electro-mechanical tuners or solid state element control signals for electronic tuners.

Tuner configuration and initialization 82H are other functions required to operate the tuner, as is well known in the tuner art.

The Telnet server may be omitted for applications employing HTTP based tuning control, in which the user-entered data are transmitted back to the tuner from the client using an HTTP protocol (e.g., GET and POST method).

Figure 5A:
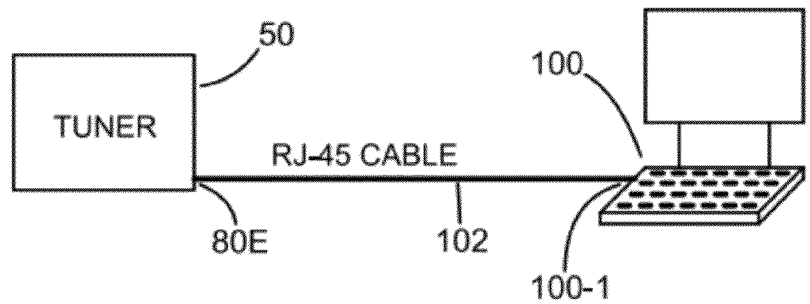
FIGS. 5A, 5B and 5C show three exemplary connections of the tuner with a computer.
Figure 5B:
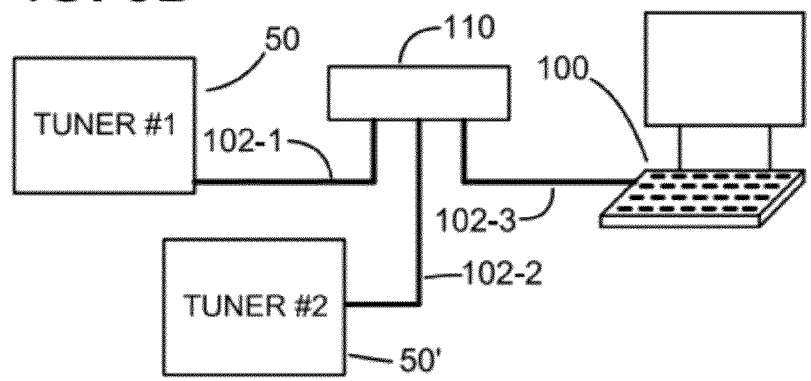
Figure 5C:
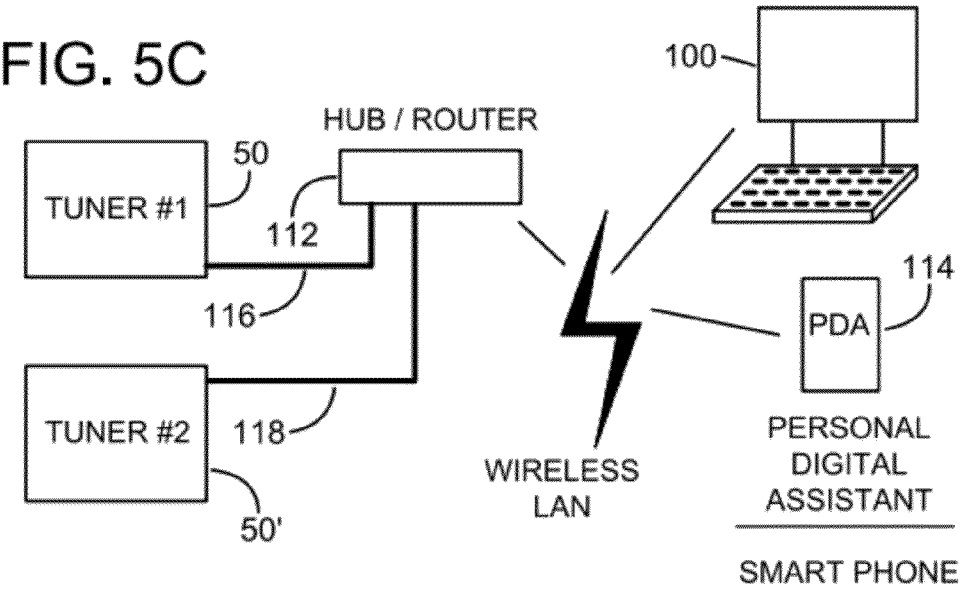

FIGS. 5A, 5B and 5C show three exemplary connections of an exemplary tuner 50 with a computer 100. FIG. 5A shows a direct connection using an RJ-45 Ethernet cable 102, connected between Ethernet ports 80E on the tuner 50 and 100-1 of the computer. FIG. 5B shows a connection of one or more than one tuner system 50, 50' with the computer 100 via a hub/switch 102 and Ethernet cables 102-1, 102-2 and 102-3. FIG. 5C shows a wireless connection between the computer 100 and other control devices 114 such as a PDA or smart phone, using a wireless router 112. The tuner system 50 as well as other tuner systems 50' are connected to the wireless router 112 by communication links 116, 118 as described above regarding the system of FIG. 5B. The links 116, 118 may be Ethernet cables, or wireless interfaces. In each case, if the controller is external to the impedance tuner, as in FIG. 1B, then the computer system connection is to the tuner controller 80', rather than directly to the tuner 50 itself.

In an exemplary embodiment, the tuner controller 80 may support multiple communication protocols:

Telnet: the user PC sends text, ASCII, commands.

FTP: file transfer protocol to access the tuner file system.

HTTP: allows tuner control by a web browser, and may provide a web page with an embedded JAVA applet.

The controller 80 can be configured to run, in an exemplary embodiment, the LXI standard instrument control protocol, described more fully at LXI.org. In such case, the tuner calibration files, for example, may be converted from tuner-specific format to LXI format.

The computer 100 is configured to run an HTTP client software application 100A (FIG. 7A), such as a web browser, e.g. Windows Explorer, Mozilla Firefox or Apple Safari. The user utilizes the browser 100A to navigate to the IP address of the tuner (which for convenience can be displayed on the tuner display), using the HTTP channel 120 established with the RJ-45 cable connected between the Ethernet ports of the tuner controller and the computer (FIG. 7A). The browser fetches and displays the tuner main web page 82E-3A (FIG. 6) that includes several command buttons. Clicking the "TUNER APP" button, for example, will display the tuning web page with an embedded JAVA applet.

FIG. 6 is an exemplary screen shot of an exemplary welcome page 82E-3A displayed when the user's browser 100A, running on computer 100, connects to the tuner 50, by navigating to the IP address of the tuner (which is displayed on the tuner display panel, as described above). The buttons on left side (WELCOME, TUNER APP, NETWORK, FIRMWARE, HELP) allow browser navigation to other web pages that are downloaded from the tuner after the pressing the corresponding button. In an exemplary embodiment, only the TUNER APP page embeds a JAVA applet, all other pages are based on HTTP only.

FIG. 7 illustrates a screen shot of an exemplary TUNER APP web page 82E-3B with an embedded JAVA applet. As is well known to those skilled in the art, a JAVA applet is a program written in the Java programming language that can be included in an HTML page. When a Java technology-enabled browser is used to view a page that contains an applet, the applet's code is transferred to the computer system and executed by the browser's Java Virtual Machine (JVM). The JAVA applet has several tabs, "Tuning," "Test Setup," and "Tuner Config." FIG. 7 shows the TUNER APP page with the Configuration Tab active. On start-up, the JAVA applet will establish communication via the Telnet communication channel with the tuner controller. FIG. 7A diagrammatically illustrates how the JAVA applet opens a direct Telnet communication channel 122 to the tuner to send commands and retrieve data. The JAVA applet is aware of the text based tuner command language. The page shown in FIG. 7 allows the user to configure the tuner system parameters, for each of the tuner motors, 1, 2 and 3 in this example. In an exemplary embodiment, on activation of a 'motor tab', the JAVA applet sends a motion profile query command (PROFILE?) to the tuner via Telnet to obtain the presently active parameter values. Updated parameter values are sent back to the tuner via the Telnet channel when the user switches to a different motor tab or applet page. The applet reads the updated values from the text boxes, composes the corresponding tuner command string, and sends the command string to the tuner.

FIG. 8 shows a screen shot of an exemplary TUNER APP, Test Setup, web page 82E-3C that allows the user to configure the tuner test setup, including tuner calibration file, and fixture, tuner 'backside' network and termination s-parameter data. The test setup is schematically shown, in this example as including the fixture, tuner, BACK, and the termination. The device under test (DUT) frequency is selected, and the number of harmonic frequencies to be displayed. The actual S parameters of the various setup blocks are shown in the data table. In one exemplary embodiment, the table data are obtained by sending the 'S-PARAMETER?' query command via Telnet to the tuner. The setup definitions may be saved to or recalled from a setup file stored on the controller on-board file-system.

In an exemplary embodiment, the setup definition proceeds in the following manner, using tuner-specific commands for a tuner system. After the JAVA applet is booted, the setup is defined, including calibration file and de-embedding data files for fixture, back and termination (referring to the setup schematic shown in FIG. 8). By default in this example, fixture and back are perfect THRUs and termination is 50 ohm. Exemplary tuner-specific commands used for setup definition include the following:

CAL nnnnn.LXI defines the tuner calibration file.

FIXTURE mmmm.S2P defines s-parameter file for FIXTURE.

BACK bbbb.S2P defines s-parameter file for BACK network.

TERM tttt.S1P defines s-parameter file for TERMINATION.

FREQ fGhz [nHarm] loads calibration data for given frequency. nHarm defines the number of harmonics to be loaded. A default is to use 10 to load all harmonics found in the file.

SAVE fname save current setup to file on flash memory card.

RECALL fname recall previously saved setup.

Calibration and de-embedding data are loaded from flash memory 80C to RAM after the FREQ command is sent from the client to the controller to define the frequency and the number of harmonics to use:

Loading calibration and de-embedding data may take several seconds, depending on the density of calibration points.

FIG. 9 shows a screen shot of an exemplary TUNER APP tuning page 82E-3D. In this example, the user clicks a point in the SMITH chart 82E-3D1 displayed on the page, and the tuner sets the corresponding impedance, or the user manually enters a target value in the corresponding text boxes and clicks the TUNE button. In both cases, the JAVA applets composes a TUNE command string with the user defined target values and sends the command string via the Telnet channel to the tuner controller. The tuner controller then issues appropriate motor commands (mechanical tuner) or solid state element control signal value settings (electronic tuner) and reports the new tuner status back to the applet. Text boxes show actual sample impedance values after tuning has completed.

Figure 10:
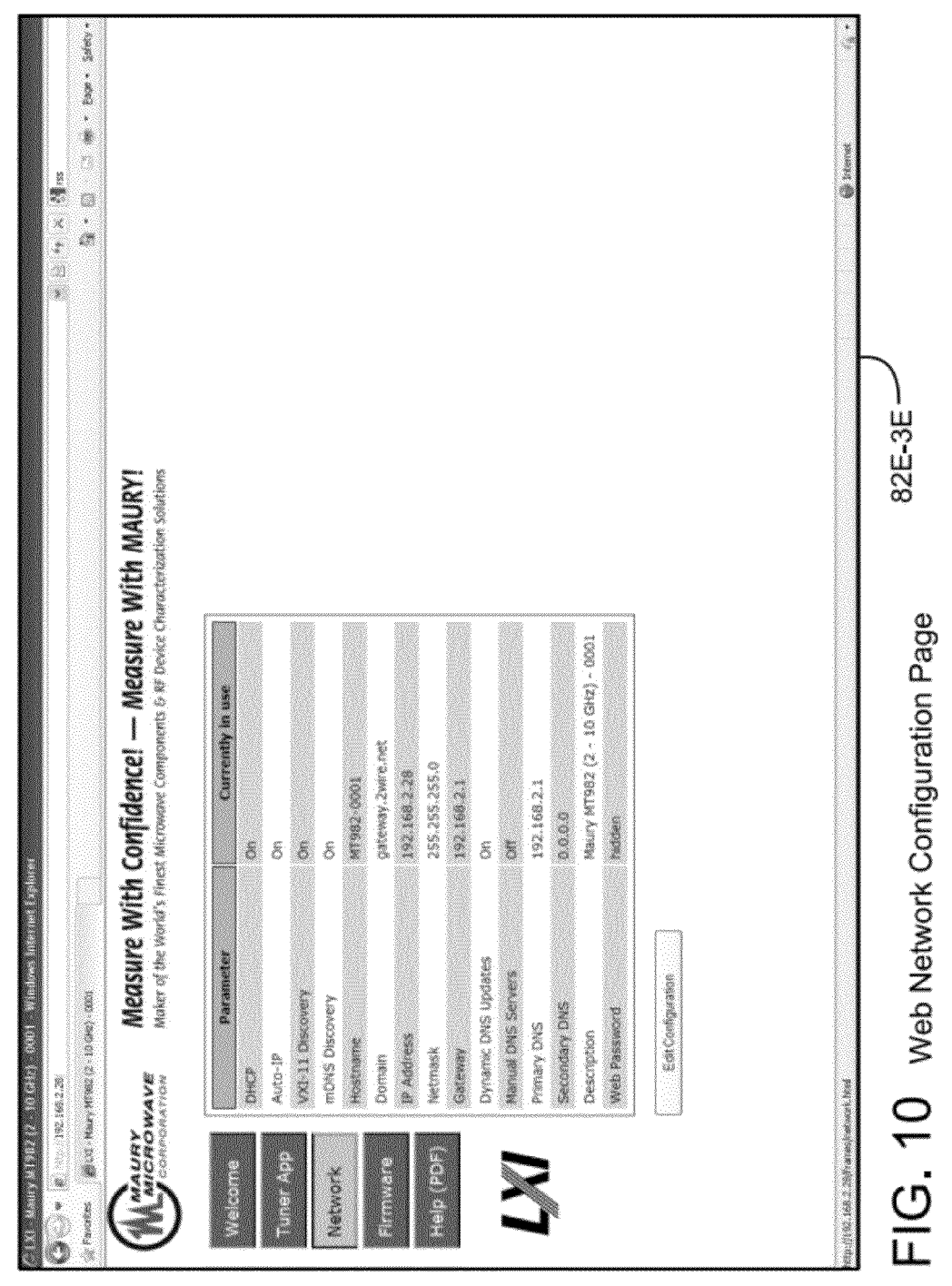

FIG. 10 depicts an exemplary network configuration web page 82E-3E of the tuner 50. This shows the network parameters in use by the tuner system.

Figure 11:
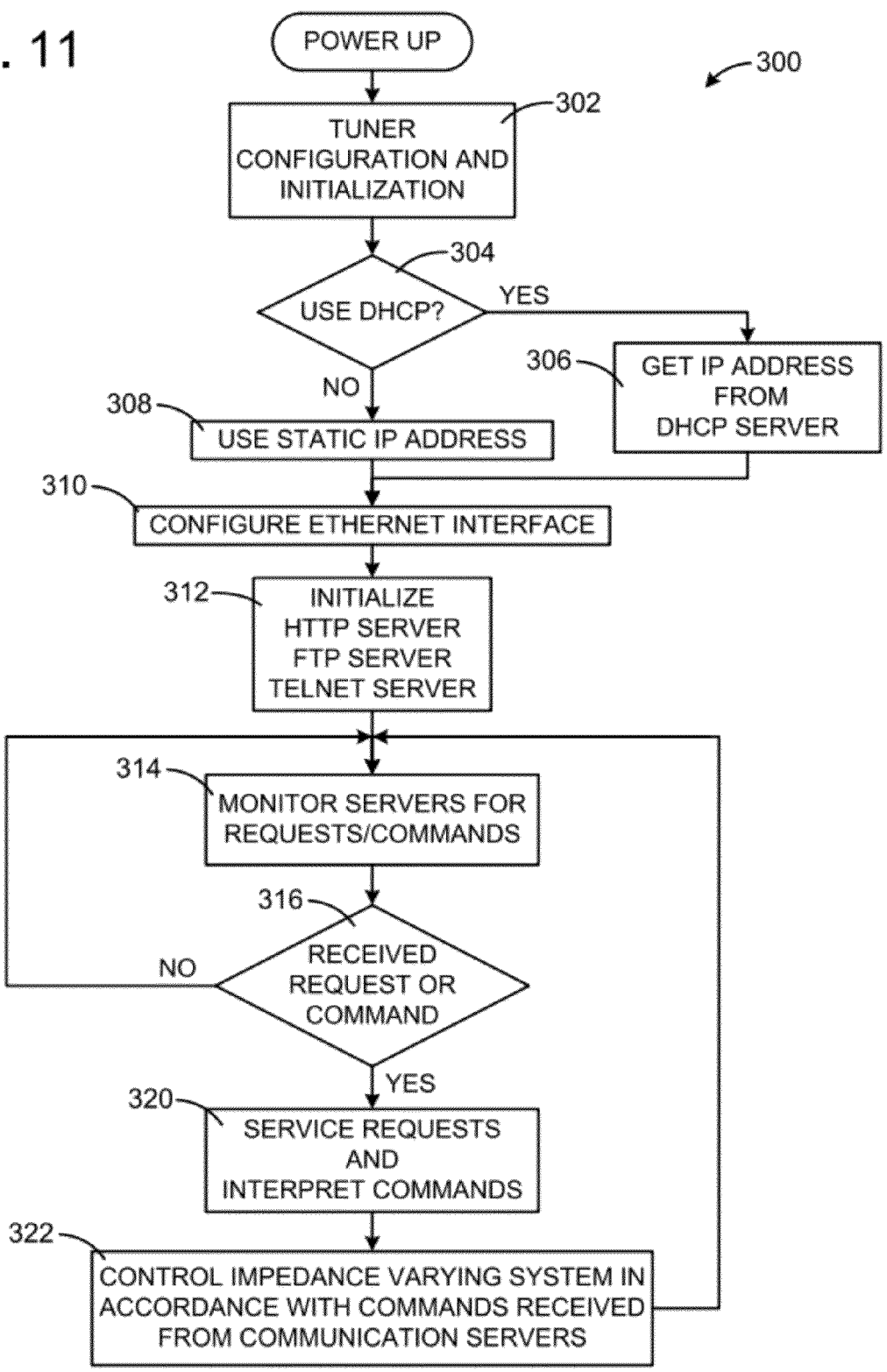
FIG. 11 is a flow diagram illustrating an exemplary embodiment of operation of a web-enabled tuner controller.

FIG. 11 illustrates an exemplary flow diagram of an algorithm 300 implemented by the tuner controller processor. After the tuner controller has been powered up, the tuner is initialized at step 302. This can include checking the memory card 82C, checking for a firmware upgrade stored on the memory card, reading the tuner configuration details and file data from the controller memory, and setting the impedance varying system to an initial state. For example, in the case of an electromechanical tuner, the carriage and probe motors are set to initial positions, and the carriages driven to tuner initialization positions, so that the initial positions of the carriages and probes are defined. For electronic tuners using PIN diodes for example, this can include setting the bias states of the various diodes so that the initial state is set.

At steps 304, 306, 308, the IP address of the tuner controller is determined. This can be obtained, in the case of a controller configured to support DHCP, by getting the dynamic IP address from a DHCP server on the network to which the controller is connected (step p306). Alternatively, for the case in which the tuner controller is configured for a static IP address, the controller will use the device's static IP address (step 308). In an exemplary embodiment, the controller supports DHCP, and tries to obtain an IP address from a DHCP enabled host connected on the network. If the attempt fails, the controller falls back to a default static address. At 310, the controller configures the Ethernet interface, for TCP/IP support. The currently active IP address is shown on the controller or tuner display.

At step 312, the HTTP, FTP and Telnet servers 82A-3, 82A-2 and 82A-1 (FIG. 4) are initialized. The controller monitors the servers at 314 for requests or commands received through the servers, and waits until a request or command is received (step 316). The controller then responds appropriately to an requests, e.g. by sending a web page to the requester, and interprets any commands (by command interpreter 82B, FIG. 4). At 322, the impedance varying system 20 (FIG. 1) is controlled in accordance with commands received from the communication servers, by tuning control 82G and motion control 82F (FIG. 4). Operation then returns to 314 to look for more requests or commands.

Figure 12:
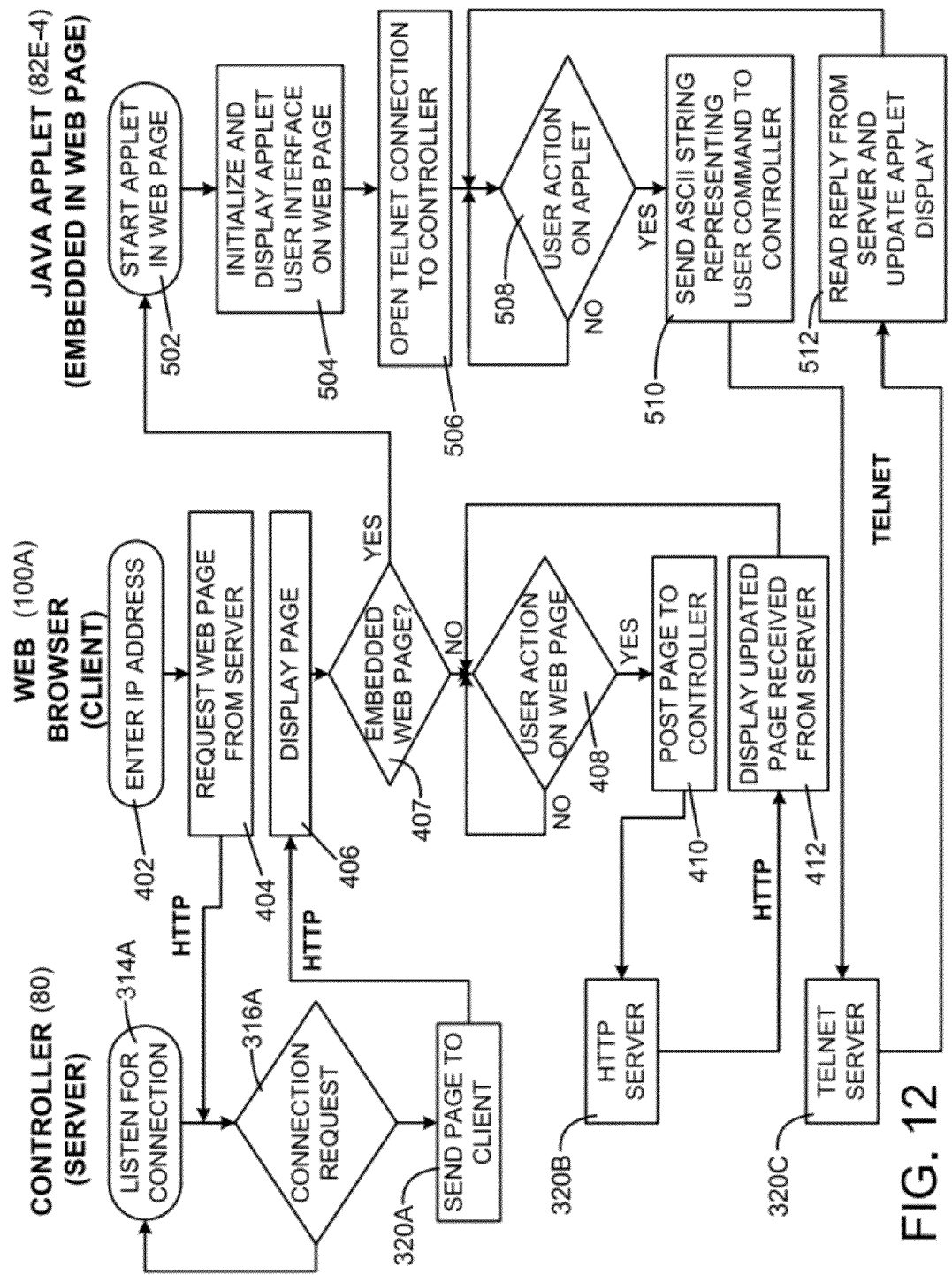
FIG. 12 is a flow diagram illustrating interaction between a web-enabled tuner controller, a client web browser and a JAVA applet.

FIG. 12 is a flow diagram illustrating an exemplary embodiment of a web-enabled tuner system controller and interaction with a web browser running on a computer system connected to the tuner controller. The flow diagram generically illustrates both the case in which the browser client is configured to send commands to the tuner controller by Telnet communication channel operation using a JAVA applet, and the case in which the browser is configured to send the commands by the HTTP channel. While illustrating both cases, it is to be understood that a web-enabled tuner controller may be configured to support only one, or both of these communication options.

Still referring to FIG. 12, the controller 80 in operation listens (314A, 314B) for connection requests from a client on a TCP network. At the client web browser 100A, the user enters (402) the IP address of the tuner into the browser to send (404) an HTTP request to the tuner controller 80. Once a request is received, the controller sends a web page (e.g. page 82E-3A, FIG. 6) to the client. The web page is displayed (406) on the computer system display, and the embedded JAVA applet (82E-4) is started (502). The applet initializes and displays (504) the applet user interface on the web page. A Telnet communication channel to the controller is opened (506). The user can enter a desired tuner action on the applet, at 508, and once that occurs, the JAVA applet converts (510) the user entry into an ASCII string representing the user command for transmission (510) over the Telnet channel to the Telnet server 82A-1 of the controller 80. The command interpreter of the controller interprets the ASCII string commands into tuner-specific commands to control the impedance-varying system of the tuner. The controller 80 sends a reply through the Telnet server back to the client, and the JAVA applet is configured to read the reply and update the applet display.

The tuner commands sent from the client browser will be tuner-dependent. Exemplary tuner commands include the following:

1. ? Display list of supported commands. Example:?
2. ADAPTER fname Defines 2 port s-parameter data file for adapter inserted between DUT and tuner. Data are loaded into memory after sending FREQ command. Example: ADAPTER fix_in.s2p
3. BACK fname Defines 2 port s-parameter data for network inserted between tuner and termination. Data are loaded into memory after sending FREQ command. Example: BACK atten.s2p
3. CAL fname Defines calibration data file. Data are loaded into memory after sending FREQ command. Example: CAL mt982a.lxi 4. CALINFO fname Displays information about content of cal file fname, including frequency list, number of harmonics, number of calibration points. Example: CALINFO mt982a.lxi
5. CLEAR Clears all setup definitions (file names). Example: CLEAR
6. DIR [ext] Directory of files stores on flash disk. Example: DIR S2P (shows all files having extension 's2p')
7. DUMP Generates detailed report of s-parameter at current probe position. Example: DUMP
8. ECHO flag Allows turning command echo ON (flag=1) or OFF (flag=0). Example: ECHO 1
9. FIXTURE fname Defines 2port s-parameter data file for fixture inserted between DUT and tuner. Data are loaded into memory after sending FREQ command. Example: FIXTURE fix_in.s2p
10. FREQ fGHz [nHarm] Loads calibration and s-parameter data for currently defined setup. Example: FREQ 2.1 3
11. GAMMA? [idx] Reports GAMMA in DUT reference plane. Use IDX>0 to report GAMMA at specific harmonic only. IDX=0 reports GAMMA for fundamental and all harmonics. Examples: GAMMA? GAMMA? 1
12. INIT Initializes carriage and all probes of tuner. Example: INIT
13. MODEL model defines tuner
14. OPC? Operation complete status Return value=0, not completed (busy) Return value=1, completed (idle) Example: OPC?
15. POS mot pos Allows to manually set carriage and probe position. Multiple motors can be programmed with single command. Mot=1→carriage Mot=2→low frequency probe Mot=3→high frequency probe. Examples: POS 1 200 2 4500 3 2000 POS 2 3000
16. POS? [motor] Reports current motor position, even while motors are moving. Example: POS?
17. PROFILE? Reports motor operation parameters. Example: PROFILE?
18. REBOOT Re-boots the processors and run complete firmware and tuner initialization. Example: REBOOT
19. RECALL fname Recalls previously saved setup definitions. Example: RECALL mysetup.cfg
20. RESET Resets fixture/adapter s-parameter to perfect THRU, term to perfect LOAD, and releases memory allocated to store calibration. Example: RESET
21. SAVE fname Saves currently active setup definitions to file on flash memory card. Example: SAVE mysetup.cfg
22. SETUP? Displays information about currently active configuration: Tuner calibration file, Adapter Fixture, Back network, Termination, Frequency. Example: SETUP?
23. SPAR? [idx] Report S PARAMETER of path between DUT and Load (including FIXTURE, TUNER and BACK). Example: SPAR?
24. STATUS? Reports status of tuner. Return value=0→tuner is IDLE. Return value>0→tuner is busy (bit0→carriage, bit 1→probe1, etc. . . . ). Example: STATUS?
25. TERM fname Defines 1 port s-parameter of termination. Data are loaded into memory after sending FREQ command. Example: TERM nload.s1p
26. TUNETO mag [phase] Sets tuner to specified mag/phase in DUT reference plane. If phase is omitted, carriage is not moved and only magnitude will be adjusted. Example: TUNETO .5 120
27. TUNEVSWR mag [phase] Same as TUNETO, but VSWR instead of gamma mag is given. If phase is omitted, carriage is not moved and only magnitude will be adjusted. Example: TUNEVSWR 3 120
28. VSWR? [idx] Reports VSWR in DUT reference plane. Use IDX>0 to report VSWR at specific harmonic only. IDX=0 reports VSWR for fundamental and all harmonics. Examples: VSWR?

For the case in which a JAVA applet is not embedded in the web page downloaded to the client browser, at 408, the browser looks for user action on the web page, for example, typing a target impedance value into a text box, or selecting from a drop down menu. Once the user inputs a data value or command on the web page, the page is posted to the HTTP server on the tuner controller, through the HTTP channel. The HTTP server provides the data or commands to the command interpreter 82B, which in turn provides tuner-specific command or control signals to the tuning control 82G and motion control 82F functions of the tuner controller. The controller then prepares an updated web page and the HTTP server 82A-3 sends the updated page to the client web browser for display on the client computer system (step 412).

The unique features of one exemplary embodiment of a tuner include, for example, one or more of the following:
DHCP support (Dynamic Host Configuration Protocol)
FTP server to access file system on controller memory, e.g. flash card or EEPROM
HTTP server to allow tuner control by client application such as a web browser
Applet, e.g. JAVA applet, with a graphical user interface embedded in a web page.
Telnet server to allow tuner control by the applet.
TCP/IP protocol support
Flash memory card to store tuner files and file systems
Particular embodiments of the web-enabled tuner or tuner controller may include the following:

1. The controller is integrated with the tuner, installed in the tuner housing, and includes DHCP or static IP address support and a web page with embedded applet, e.g. a JAVA applet, to support graphical tuner control.
2. The controller is external to the tuner, and includes DHCP or static IP address support and a web page with embedded JAVA applet to support graphical tuner control.
3. The controller is integrated with the tuner, installed in the tuner housing, includes DHCP or static IP address support, and uses HTML protocol signals to send commands and data between the tuner and the computer.
4. The controller is external to the tuner, includes DHCP or static IP address support, and uses HTML protocol signals to send commands and data between the tuner and the computer.

Although the foregoing has been a description and illustration of specific embodiments of the subject matter, various modifications and changes thereto can be made by persons skilled in the art without departing from the scope and spirit of the invention. For example, it is well known that the computer and software technologies advance and change rapidly. Therefore, other software languages, interfaces and communication protocols that either currently exist or may become available in the future could be used in other embodiments of this invention. For example, while the embedded applet has been described above as a JAVA applet, other applets developed with other languages such as C# (Microsoft), F# (Microsoft) could be employed as well.

What is claimed is:
1. A web-enabled electronic controller for controlling an impedance tuner in an RF measurement system, the impedance tuner including an RF signal transmission line and an electronically-controllable impedance-varying system coupled to the signal transmission line for controlling the impedance presented by the signal transmission line, the web-enabled controller comprising;

an electronic processor configured to process external command signals and generate electronic control signals to configure the impedance-varying system of the impedance tuner in response to the command signals;

an electronic memory for storing sets of data and one or more web pages;

a communication server with an Internet Protocol (IP) address, the server supporting HTTP (Hypertext Transfer Protocol) communication and configured to receive or send signals through a TCP/IP communication channel from or to a client computer system;

the communication server configured on said IP address to be responsive to an HTTP request message from a client computer system to send a response comprising the web page to the client computer system;

the controller configured to process commands received from the client computer system through the communication server into the electronic control signals and to control the impedance-varying system of the impedance tuner during a measurement or calibration process conducted by the RF measurement system, and wherein during the measurement or calibration process first and second input/output ports of the impedance tuner connected to the RF signal transmission line are connected to at least one of the DUT, a signal source, a termination, a network analyzer or equipment, and the RF measurement system is configured during a measurement process to measure characteristics of a device under test (DUT) connected to the RF measurement system by sampling and measuring signals applied to and coming from the DUT.

2. The controller of claim 1, wherein the controller is integrated with the impedance tuner system and disposed in a tuner system housing with the transmission line and the impedance-varying system.

3. The controller of claim 1, wherein the controller is an external controller separate from the impedance tuner system and electrically connected to the impedance tuner system.

4. The controller of claim 1, further comprising a file transfer server supporting FTP (file transfer protocol), and the memory is configured to store configuration data files for the tuner.

5. The controller of claim 1, wherein said client computer system includes a web browser, and one of said at least one web pages has an embedded application program, the embedded application program configured to translate web page entered commands by a user through the browser into second protocol signals for transmission to the controller through a second protocol signal channel.

6. The controller of claim 5, wherein said second protocol utilizes ASCII or text-based commands supported by the controller.

7. The controller of claim 1, further comprising a display for visually displaying said IP address.

8. The controller of claim 1, wherein the communication server supports the Dynamic Host Configuration Protocol (DHCP) and the IP address is a dynamic IP address.

9. A method for controlling an impedance tuner system, comprising:

providing a web-enabled controller, having a communication server with an Internet Protocol (IP) address;

connecting an impedance tuner in an RF measurement system to provide a measurement or calibration test setup, the impedance tuner including an RF signal transmission line and an electronically-controllable impedance-varying system coupled to the signal transmission line for controlling the impedance presented to a device under test (DUT) connected in the RF measurement system for sampling and measuring signals applied to or coming from the DUT in the measurement test setup, the impedance tuner including first and second input/output ports each configured for connection to the DUT or equipment comprising the RF measurement system;

the web-enabled controller configured to generate tuner drive signals to control the electronically-controllable impedance-varying system of the impedance tuner;

storing web pages on the controller or memory associated with the controller;

sending an HTTP client request to the IP address of the communication server from a client computer through a TCP/IP communication channel;

in response to the client request, sending the web page to the client computer from the controller through the TCP/IP communication channel;

entering user commands through the web page and transmitting signals representing the user commands to the tuner controller;

processing the user commands to provide the tuner drive signals to set the impedance tuner to a state determined by the user commands.

10. The method of claim 9, wherein said entering user commands and transmitting signals representing the user commands to the tuner controller comprises:

using an HTTP post method to send HTML page with user data through said TCP/IP communication channel to the tuner controller.

11. The method of claim 9, wherein said entering user commands and transmitting signals representing the user commands to the tuner controller comprises:

opening a second communication channel between the tuner controller and the client computer system;

converting the user commands into text-based protocol signals and transmitting the text-based protocol signals on the second communication channel to the tuner controller;

processing the text-based protocol signals by a second controller communication server to provide tuner drive signals to set the tuner to a state determined by the text-based protocol signals.

12. The method of claim 11, wherein the web page has an embedded applet, the method further comprising:

opening the web page at the client computer system on a web browser, the applet opening and running on the client computer system to open the second communication channel and to convert graphical user commands into said text-based protocol signals.

13. The method of claim 9, wherein the tuner controller further comprises a file transfer server supporting the FTP (file transfer protocol), and a memory is configured to store data files for the tuner, the method further comprising:

transferring a tuner configuration file from the client computer system to the tuner using FTP.

14. An impedance tuner system for controlling an impedance in a calibration test setup or presented to a device under test (DUT) in a measurement test setup, comprising:

a housing structure;

first and second input/output ports each configured for connection to at least one of the DUT, a signal source, a termination, a network analyzer or other equipment in the measurement or calibration setup;

an RF signal transmission line disposed within the housing structure and connected between the first and second input/output ports;

an impedance-varying system disposed in the housing structure and coupled to the signal transmission line for affecting the impedance presented by the signal transmission line, the impedance-varying system including at least one electrically controllable component in response to electronic control signals;

a tuner communication port;

a web-enabled system controller integrated with the tuner and disposed in the tuner housing, including:

an electronic processor configured to process external command signals received through the tuner communication port and generate the electronic control signals to configure the impedance-varying system in response to the command signals;

an electronic memory for storing sets of data and a web page having an embedded application program;

an IP client configured to obtain or have an Internet Protocol (IP) address;

a communication server configured on the IP address, the server supporting HTTP (Hypertext Transfer Protocol) communication and configured to receive or send signals through a TCP/IP communication channel from or to a client computer system;

the communication server configured to be responsive to an HTTP request message from a client computer system to send a response comprising the web page to the client computer system;

the controller configured to process commands received from the client computer system through the communication server into the electronic control signals.

15. The system of claim 14, wherein the impedance-varying system is an electromechanical system including a probe, a carriage for carrying the probe and first and second motors for positioning the carriage along the RF signal transmission line, and for positioning the probe in directions transverse to the transmission line.

16. The system of claim 14, further comprising a display for visually displaying tuner status information including the tuner IP address.

17. The system of claim 14, wherein the controller further comprises a file transfer server supporting the FTP (file transfer protocol), and the memory is configured to store configuration and calibration data files for the tuner and the file transfer server is configured to transfer the files between the client and the tuner.

18. The system of claim 14, wherein the controller further comprises a second communication server supporting signals conforming to a text-based signal protocol.

19. The system of claim 18, wherein the IP address is a dynamic IP address, and said IP client is a DHCP client configured to request a valid IP address from a DHCP server.

20. The system of claim 19, wherein the IP client is further configured with a default IP address for use if a valid IP address is not obtained from the DHCP server.

21. A method for controlling an impedance tuner system, comprising:

providing an RF measurement system, the system including a web-enabled impedance tuner system, having an integrated controller with an integrated DHCP (Dynamic Host Configuration Protocol) client configured to request a valid Internet Protocol (IP) address from a network DCHP server, the impedance tuner including an RF signal transmission line and an electronically-controllable impedance-varying system coupled to the signal transmission line for controlling the impedance presented by the RF signal transmission line in a a calibration test setup or to a device under test (DUT) connected to the RF measurement system in a measurement test setup, the impedance tuner including first and second input/output ports each configured for connection to at least one of the DUT, a signal source, a termination, a network analyzer or other equipment in the measurement or calibration test setup;

storing web pages on the impedance tuner with an embedded applet having a tuner system graphical user interface;

sending an HTTP client request to the IP address from a client computer through a TCP/IP communication channel;

in response to the client request, sending the web page with the embedded applet to the client computer from the impedance tuner using HTTP protocol;

running the applet on the client computer and entering user commands via the graphical user interface, the applet converting the user commands to text-based protocol command signals;

opening a second communication channel and transmitting the text-based protocol command signals on the second communication channel;

receiving the text-based protocol signals at the controller of the impedance tuner and processing the text-based protocol signals to provide tuner drive signals to set the impedance-varying system of the impedance tuner to a state determined by the text-based protocol signals.

22. The method of claim 21, wherein the integrated tuner controller further comprises a file transfer server supporting the FTP (file transfer protocol), and a memory is configured to store data files for the tuner, the method further comprising:

transferring a tuner configuration file from the client to the tuner using FTP.

23. The method of claim 21, wherein said sending an HTTP client request comprises:

sending the HTTP client request from a web browser.

24. The method of claim 21, wherein the second signal protocol employs a text-based protocol.

25. A web-enabled electronic controller for controlling an impedance tuner including an RF signal transmission line and an electronically-controllable impedance-varying system coupled to the signal transmission line for affecting the impedance presented by the signal transmission line in an RF measurement system connected to a device under test (DUT) for measuring characteristics of the DUT, the web-enabled controller comprising:

an electronic processor coupled to the impedance-varying system of the impedance tuner configured to process external command signals and generate electronic control signals to the impedance-varying system to configure the impedance-varying system and control the impedance presented by the impedance tuner in response to the command signals;

an electronic memory for storing sets of data and one or more web pages;

a communication server configured to receive or send signals through a communication channel from or to a client computer system;

the communication server configured to be responsive to a request message from a client computer system to send a response comprising the web page to the client computer system using the communication channel;

and wherein, with first and second input/output ports of the impedance tuner each connected to at least one of the DUT, a signal source, a termination, a network analyzer or other equipment in a measurement or calibration setup, the controller is configured to process commands received from the client computer system into the electronic control signals to set the impedance tuner to a state determined by the commands.

26. The controller of claim 25, wherein:
the communication server is configured to support an Internet Protocol (IP) address and HTTP (Hypertext Transfer Protocol) communication and the communication channel is a TCP/IP communication channel.

27. The controller of claim 25, wherein the controller is integrated with the impedance tuner system and disposed in a tuner system housing with the transmission line and the impedance-varying system.

28. The controller of claim 25, wherein the controller is an external controller separate from the impedance tuner system and electrically connected to the impedance tuner system.

29. The controller of claim 25, further comprising a file transfer server, and the memory is configured to store configuration data files for the tuner.

30. The controller of claim 25, wherein said client computer system includes a web browser, and one of said at least one web pages has an embedded application program, the embedded application program configured to translate web page entered commands by a user through the browser into second protocol signals for transmission to the controller through a second protocol signal channel.

31. The controller of claim 30, wherein said second protocol utilizes text-based commands supported by the controller.

32. The controller of claim 26, further comprising a display for visually displaying said IP address.

33. The controller of claim 25, wherein the communication server supports the Dynamic Host Configuration Protocol (DHCP) and a dynamic IP (Internet Protocol) address.

34. A method for controlling an impedance tuner system, comprising:
providing a web-enabled controller, having a communication server;
connecting an impedance tuner in an RF measurement system to provide a measurement or calibration test setup, the impedance tuner including an RF signal transmission line and an electronically-controllable impedance-varying system coupled to the signal transmission line for controlling the impedance presented by the signal transmission line in the calibration test setup or, with a device under test (DUT) connected in the measurement test setup for measurement of characteristics of the DUT, the impedance tuner including first and second input/output ports each configured for connection to at least one of the DUT, a signal source, a termination, a network analyzer or other equipment in the RF measurement system;
configuring the web-enabled controller to control the electronically-controllable impedance-varying system of the impedance tuner system;
storing web pages on the controller or memory associated with the controller;
sending a client request to the communication server from a client computer through a communication channel;
in response to the client request, sending the web page to the client computer from the controller through the communication channel;
entering user commands through the web page and transmitting signals representing the user commands to the tuner controller;
processing the user commands to provide tuner drive signals to set the tuner to a state determined by the user commands.

35. The method of claim 34, wherein:
the communication server is configured to support an Internet Protocol (IP) address and HTTP (Hypertext Transfer Protocol) communication and the communication channel is a TCP/IP communication channel.

36. The method of claim 35, wherein said entering user commands and transmitting signals representing the user commands to the tuner controller comprises:
using an HTTP post method to send HTML page with user data through said TCP/IP communication channel to the tuner controller.

37. The method of claim 34, wherein said entering user commands and transmitting signals representing the user commands to the tuner controller comprises:
opening a second communication channel between the tuner controller and the client computer system;
converting the user commands into text-based protocol signals and transmitting the text-based protocol signals on the second communication channel to the tuner controller;
processing the text-based protocol signals by a second controller communication server to provide tuner drive signals to set the tuner to a state determined by the text-based protocol signals.

38. The method of claim 37, wherein the web page has an embedded applet, the method further comprising:
opening the web page at the client computer system on a web browser, the applet opening and running on the client computer system to open the second communication channel and to convert graphical user commands into said text-based protocol signals.

39. The method of claim 34, wherein the tuner controller further comprises a file transfer server, and a memory is configured to store data files for the tuner, the method further comprising:
transferring a tuner configuration file from the client computer system to the tuner.

* * * * *